United States Patent
Liu et al.

(10) Patent No.: US 7,339,899 B2
(45) Date of Patent: Mar. 4, 2008

(54) METHOD AND SYSTEM FOR NETWORK EMULATION USING PACKET REORDER EMULATION TECHNIQUES

(75) Inventors: Yunxin Liu, Beijing (CN); Zheng Ni, Beijing (CN); Jian Wang, Beijing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 10/955,578

(22) Filed: Sep. 30, 2004

(65) Prior Publication Data

US 2006/0072628 A1    Apr. 6, 2006

(51) Int. Cl.
*H04L 12/26* (2006.01)
(52) U.S. Cl. .................. 370/252; 370/235; 370/394; 709/224
(58) Field of Classification Search ............. 370/252, 370/253, 235, 390, 401, 394; 709/224
See application file for complete search history.

(56) References Cited

U.S. PATENT DOCUMENTS

| | | | |
|---|---|---|---|
| 6,674,726 B1* | 1/2004 | Kado et al. | 370/253 |
| 6,785,241 B1* | 8/2004 | Lu et al. | 370/241 |
| 2004/0120319 A1* | 6/2004 | Asawa et al. | 370/395.4 |
| 2005/0007958 A1* | 1/2005 | Auerbach | 370/241 |
| 2006/0067351 A1* | 3/2006 | Liu et al. | 370/429 |
| 2006/0069544 A1* | 3/2006 | Liu et al. | 703/27 |
| 2007/0165528 A1* | 7/2007 | Brown et al. | 370/235 |

* cited by examiner

Primary Examiner—Ricky Q. Ngo
Assistant Examiner—Gary Mui
(74) Attorney, Agent, or Firm—Merchant & Gould P.C.

(57) ABSTRACT

Emulating a packet reorder condition in a network includes maintaining a counter variable to count packets sent out since the most recent reordered packet. When a new packet arrives, if the counter variable is less than or equal to zero, a current packet lag value is determined. If the current packet lag value is not equal to zero, the new packet is delayed before being sent out in accordance with the lag value, and the counter is updated with the lag value. Otherwise, the new packet is sent out without delay and the counter is decreased by one. The current packet lag value is computed based on supplied configuration parameters. Delaying the new packet includes applying a latency to the packet, the latency comprising a time cost to transmit the packet multiplied by the current packet lag value.

23 Claims, 3 Drawing Sheets

METHOD AND SYSTEM FOR NETWORK EMULATION USING PACKET REORDER EMULATION TECHNIQUES

FIELD OF THE INVENTION

The present invention relates generally to computers and computer networking, and more particularly to systems and methods that incorporate network emulation techniques.

BACKGROUND OF THE INVENTION

Links across interconnected networks vary substantially with respect to such factors as bandwidth, packet latency, and error and loss rates. Before network protocols and distributed applications are deployed in a real network, it is critical that they be thoroughly tested under various realistic network conditions, to ensure correctness and to verify performance characteristics. Testing in an isolated real network is generally impractical. Therefore, testing typically involves simulation and emulation.

Network simulators generally attempt to provide a rich set of protocol modules and configuration tools suitable for conducting customized simulation experiments. However, network simulation suffers from a number of limitations. Simulators rely principally on models of both the physical network infrastructure and networking protocols. Models by definition only approximate the real conditions being tested, and in complex situations it is often impossible to develop accurate models for purposes of simulation. The functionalities provided by simulation modules are merely logical operations; thus, an implementation in a simulator must be modified before it can be deployed within a target network. Network simulators consume significant resources when the network being simulated is sufficiently large, and they do not provide a view of the network end user's experience.

By contrast, network emulators permit applications and protocols to be tested in real time, on real machines, such as locally-linked computers, using real implementations of network protocols. An emulator includes a supplementary means for imposing synthetic delays and faults on the real network traffic. In effect, the emulator comprises a virtual network with respect to the host machine or machines on which the network applications being tested are running. For a network emulator to be useful, however, it is necessary that it include techniques for emulating various network conditions realistically and accurately.

Packet out-of-order behavior is one particular real network condition that many network emulators have sought to emulate, a task that is made hindered by the difficulty with which such behavior is expressed mathematically. To emulate packet reordering, the order of packets must be altered so that the packet sequence arriving at a receiver is not the same as the sequence that left the sender. Most existing packet reorder emulation algorithms use a buffer to cache arriving packets and reorder the packets by adjusting the order in the buffer. In such cases, a packet out-of-order condition occurs only if there are multiple packets in the buffer. However, for multiple packets to be in the buffer, the sending bit rate must be greater than the underlying bandwidth. Therefore, the likelihood of having multiple packets in the buffer is fairly small. Moreover, in some network protocols, including TCP, the sending rate is adapted to underlying bandwidth conditions. This further reduces the likelihood of having multiple packets in the buffer.

SUMMARY OF THE INVENTION

The present invention is generally directed towards providing a method and system for emulating a packet reorder condition in a network. In one embodiment of the invention, emulating a packet reorder condition includes maintaining a counter variable to count packets sent out since the most recent reordered packet. When a new packet arrives, if the counter variable is less than or equal to zero, a current packet lag value is determined. If the current packet lag value is not equal to zero, the new packet is delayed before being sent out in accordance with the lag value, and the counter is updated with the lag value. Otherwise, the new packet is sent out without delay and the counter is decreased by one.

According to one aspect of the invention, determining the current packet lag value includes computing a set of parameters based on configuration parameters, including a maximum lag, a rate of reordered packets, and a probability distribution of reordered packets. The probability distribution may follow a normal distribution with a specified standard deviation. Alternatively, empirically-derived data may be substituted for the distribution.

According to another aspect of the invention, delaying the new packet includes applying a latency to the packet, the latency comprising a time cost to transmit the packet multiplied by the current packet lag value.

In accordance with another embodiment of the invention, a system for emulating a packet reorder condition includes a first computer having a network interface; an emulator link for receiving and sending packets, the emulator link comprising a virtual network link to which the first computer is connected; and a packet reorder emulation module controlled by the emulator link. One or more computers may be linked to the first computer by way of a local network.

DETAILED DESCRIPTION OF THE INVENTION

The present invention includes a network emulator that operates on real network traffic between computers, such as IP traffic, to achieve realistic and accurate emulation results, based on user-configured settings. All emulation procedures occur on an emulator link, which comprises a virtual network link. A plurality of emulation algorithms are employed, based on well-formed mathematical models for emulation of various network characteristics and conditions, including bandwidth, queue, packet loss, latency, error propagation, packet out-of-order, and background traffic. The invention is usable for emulation of wired and wireless network scenarios. In one embodiment, the invention provides a software-based network emulator for use in a conventional general-purpose computing system, although embodiments incorporating the invention wholly or partly in hardware or in special-purpose devices are also contemplated.

Additional inventive architectural aspects of the network emulator are described in further detail in the co-pending commonly-assigned U.S. patent application, "Network Emulator Architecture," Application Ser. No. 10/955,993 filed on Sep. 30, 2004, incorporated herein by reference.

Figure 1:
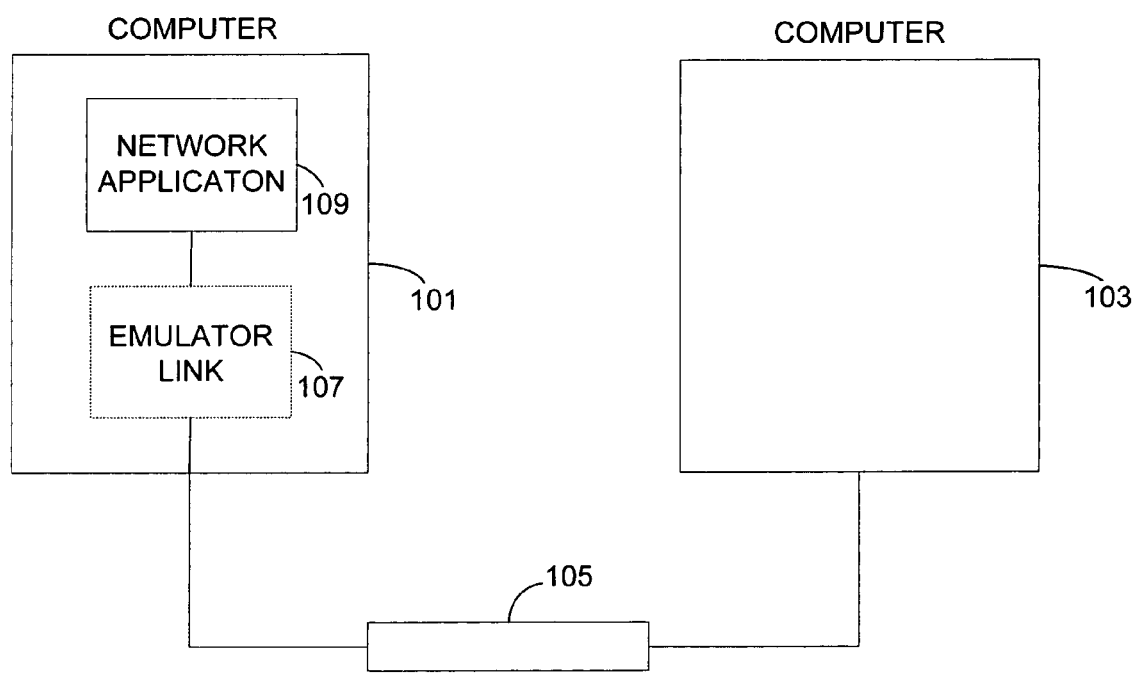
FIG. 1 is a block diagram providing a simplified illustration of one possible environment in which the present invention may be incorporated.

Turning to the drawings, FIG. 1 provides a simple illustration of one possible environment in which the present invention may be incorporated. Two computers 101, 103 are linked by way of a local network connection 105, as for example an Ethernet link. The computers 101, 103 may be computing machines of various sorts, such as personal computers, servers, workstations, portable computers, special-purpose computing devices, and the like, having appropriate network interfaces, as well as, at a minimum, such components as a processor, memory storage, and input and output interfaces. In a representative environment one computer, such as the computer 101, runs a server program, such as a TCP or UDP server, and another machine, such as the computer 103, runs a client program, such as a TCP or UDP client. The features of the various computing devices within which the invention may be incorporated are rudimentary to those having skill in the art and need not be described at length here.

At least one of the computers 101, 103, for example the computer 101, by executing one or more appropriate computer programs in accordance with the invention, establishes an emulator link 107. The emulator link 107 comprises a virtual network link operating upon outgoing or incoming data packets transmitted by or directed towards the computer 101, as by a network application 109 running on the machine 101. Those having skill in the art will appreciate that many other operating environments are possible, including those involving more than two computers generating network traffic, as well as those involving a single computer, and those involving emulation programs executing on more than one computer. Thus the environment depicted in simplified form in FIG. 1 should not be taken as limiting. Moreover, the emulator link may be established by an intermediary device acting as a router or bridge intercepting network traffic between two machines linked thereto.

Emulation Modules

Figure 2:
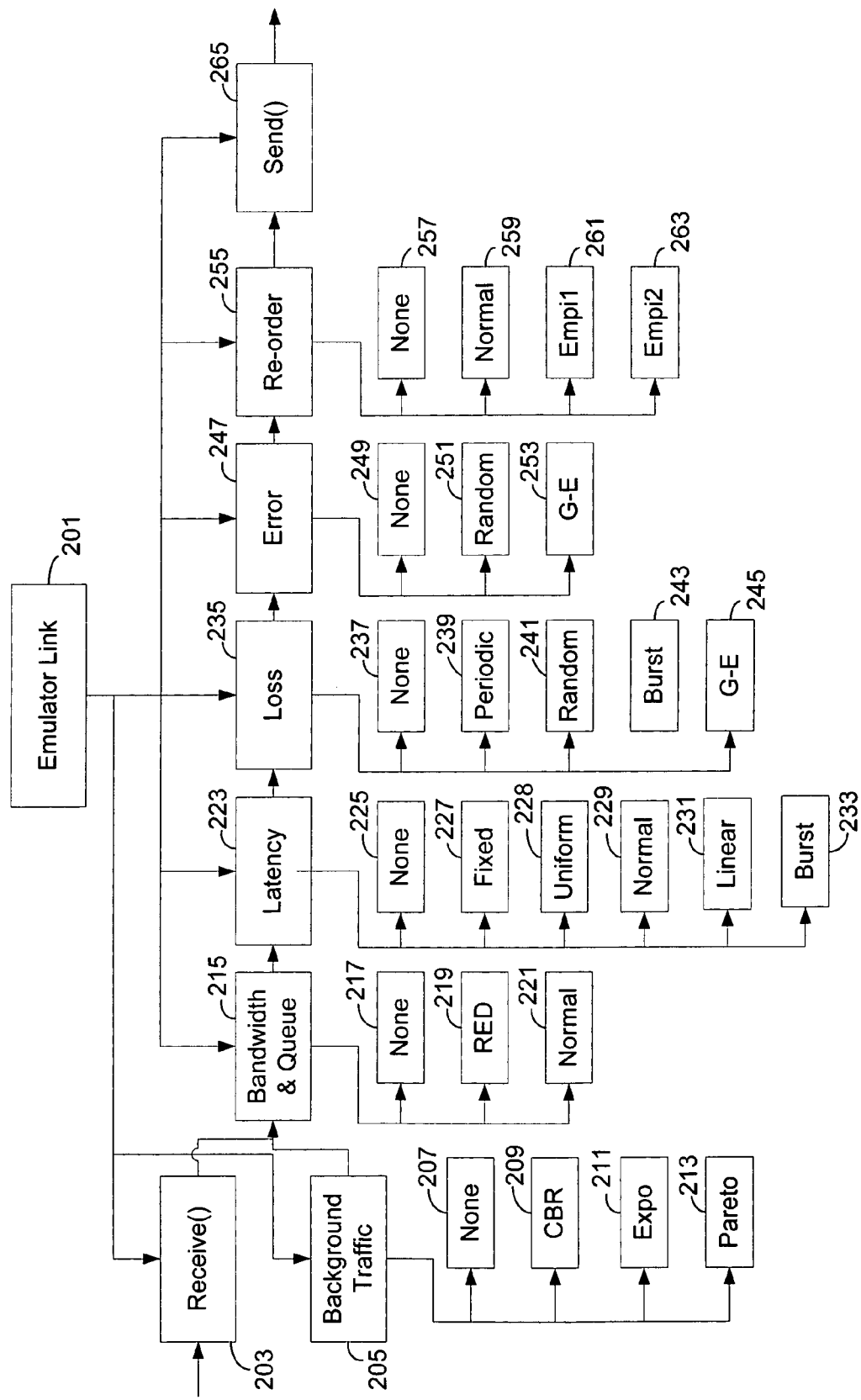
FIG. 2 is a diagram illustrating the structure of a network emulator link in accordance with the invention.

Turning now to FIG. 2, there is shown the conceptual structure of an emulator link 201 in accordance with an embodiment of the invention. The emulator link 201 is in essence a superclass that manages a plurality of emulation modules. Each module operates independently of the others. The emulation modules incorporate particular emulation algorithms and are configurable by a user of the emulator. In one embodiment, as illustrated in FIG. 2, the emulation modules include a background traffic emulation module 205, a bandwidth and queue emulation module 215, a latency emulation module 223, a loss emulation module 235, an error emulation module 247, and a packet reorder emulation module 255. An emulation module has a number of associated types facilitating configuration by the user in order to emulate particular network behaviors. Each module has a type that, if set, disables the module. These types are indicated in FIG. 2 as "None" 207, 217, 225, 237, 249, 257.

A transmitted packet enters the emulator link 201 by calling a "Receive( )" method 203. The packet is successively processed by each emulation module, after which it leaves the link 201 by calling a "Send( )" method 265. If the user does not supply configuration parameters, the emulator link 201 uses default configurations for each module. In an embodiment, the default configuration for each module is equivalent to selection of the disabling type for that module. Thus, for all modules other than the background traffic module 205, the default behavior comprises passing the received packets to the next module, if any, directly without any emulation operation. For the background traffic module 205, the default behavior is not to generate any traffic at all.

The bandwidth and queue module 215 enables emulation of various network bandwidths and queuing behaviors. To emulate different bandwidths, a queue is used. Received packets are placed in the queue and are sent out at a specific rate. Two types of queue are supported: a normal queue type 221 and a Random Earlier Drop (RED) queue type 219. The normal queue 221 places all received packets in a simple FIFO queue with a maximum queue size supplied by the user (e.g., 100 packets). The queue drops a packet when the queue size exceeds the given maximum size. With respect to the RED queue 219, two thresholds are used to determine whether the queue is congested: a minimum threshold and a maximum threshold. If the queue size is larger than the maximum threshold, the queue is congested. If the queue size is smaller than the minimum threshold, the queue is not congested. If the queue size is between the two thresholds, whether the queue is congested depends on a probability which is computed based on the two thresholds and the current queue size. In an embodiment, the probability is computed as (queue_size−min_queue_size)/(max_queue_size−min_queue_size). When a queue is congested, three dropping modes are provided to drop packets from the queue. "Drop head" mode drops packets from the head of the queue. "Drop tail" mode drops packets from the tail of the queue. "Drop random" mode drops packets randomly from the queue. A detailed description of the bandwidth emulation algorithm embodied in the bandwidth and queue emulation module is provided in the commonly assigned, co-pending U.S. patent application, "Method and System for Network Emulation Using Bandwidth Emulation Techniques," Application Ser. No. 10/955,812 filed on Sep. 30, 2004, incorporated herein by reference.

The latency module 223 enables emulation of the propagation delay behavior of a network link. Several delay pattern types are provided. In fixed latency 227, a packet is held for a fixed length of time, using a value supplied by the user. In uniform latency 228, packets are delayed randomly according to a uniform probability distribution (i.e., every value between a user-supplied minimum delay value and maximum delay value occurs with the same probability). In normal latency 229, packets are delayed randomly according to a normal probability distribution. The user supplies an average delay and a standard deviation. In linear latency 231, a packet is delayed for a time value that linearly increases from a given minimum value to a given maximum value during a given time period. When the delay time value reaches the maximum value, it cycles back to the minimum. In burst latency 233, when a delay occurs, multiple packets may be delayed continuously. The user specifies a delay value of the burst delay state, the range (minimum and maximum) of the burst delay state, and the transition probability from a good state (without any delay) to a bad state (with burst delay). For example, if delay is set to 10 milliseconds, the range is set to between 2 and 10 seconds, and the probability is set to 0.1, there is a probability of 0.1 that the link enters the burst delay state and begins to delay packets, with a fixed delay value of 10 milliseconds. The burst delay state lasts for a random value between 2 seconds and 10 seconds.

The packet loss module 235 enables emulation of packet loss behavior of a network link. Several packet loss pattern types are provided. In periodic loss 239, a packet is discarded periodically (every x packets for a user-supplied value x). In random loss 241, packets are randomly dropped in accordance with a user-supplied loss probability. In burst loss 243, when loss occurs, multiple packets are dropped continuously. The user specifies a packet loss probability and a range indicating the number of packets that should be lost continually (a maximum and minimum burst size). For example, if the probability is 0.1, the maximum is 10 packets and the minimum is 5 packets, the loss module decides whether to lose a packet with a probability of 0.1. If packet loss occurs, m packets are lost continuously, with m a random number between 5 and 10. In G-E loss 245, packets are dropped according to a Gilbert-Elliot model, in which two states, a good state and a bad state, are used to emulate the packet loss conditions of certain networks. The user specifies the packet loss rates for the good state and the bad state, and the transition probabilities from the good state to the bad state and from the bad state to the good state. The user may also specify a cycle parameter to indicate the time granularity with which to perform the G-E emulation.

The error module 247 enables emulation of the packet error propagation behavior of a network link. This is useful, for example, in emulation of wireless network links in which some bits of certain packets are corrupted during transmission. The error probability can be set using two kinds of units: bit error (the error probability of every bit in the link) and packet error (the error probability of every packet in the link). Two error pattern types are provided. In random error 251, error occurs randomly in packets; packets are corrupted randomly according to a user-supplied rate. For example, the user can set the rate to $10^{-6}$ with an error unit of bit error or to 0.01 with an error unit of packet error. In G-E error 253, packets are corrupted in accordance with a Gilbert-Elliot model. The user specifies the packet error rates for the good state and the bad state and the transition probabilities between the two states. The user may also provide a cycle parameter to indicate the time granularity with which to do G-E emulation.

The packet reorder module 255 enables emulation of packet out-of-order behavior of a network link by adding a latency to a received packet. Three packet out-of-order pattern types are provided, as explained further below in the discussion of the packet reorder emulation algorithm.

The background traffic module 205 generates virtual packets to emulate background traffic on a network link. Three traffic-generating patterns are provided. In CBR traffic 209, background traffic is generated in accordance with a given constant bit rate. The user supplies the traffic generating rate and the generated packet size. In Expo Traffic 211, background traffic is generated in accordance with an exponential on/off time distribution. The user supplies four configuration parameters: the traffic generating rate, the generated packet size, the burst time, and the idle time. In Pareto Traffic 213, background traffic is generated in accordance with a Pareto on/off time distribution. The user supplies five configuration parameters: the traffic generating rate, the generated packet size, the burst time, the idle time, and a shape parameter.

Packet Reordering Emulation Algorithm

In the present invention, packet out-of-order behavior is emulated without the use of a buffer. To re-order a packet, a latency is added according to parameters specified by the user. The parameters for configuration of packet out-of-order behavior include:

---

| | |
|---|---|
| r | rate of reordered packets |
| n | maximum packet lag |
| $(p_1, p_2, \ldots, p_n)$ | probability distribution of reordered packets, $\sum_{i=1}^{n} p_i = r$ |

--- where $P_i$ represents the probability of packets with packet lag i.

Based on these parameters, a set of parameters $(q_0, q_1, \ldots, q_n)$ is calculated according to the following:

$$\text{If} \sum_{k=1}^{n} (k+1)p_k \leq 1 \text{ then}$$

$$q_0 = 1 - \sum_{i=1}^{n} q_i$$

$$q_i = \frac{p_i}{1 - \sum_{k=1}^{n} k \cdot p_k} (i \geq 1)$$

Otherwise, $$q_0 = 0$$

$$q_i = \frac{p_i}{\sum_{i=1}^{n} p_i} (i \geq 1)$$

If a packet is to be reordered with packet lag i, the next i packets are sent out directly without any additional latency. To accomplish this, a counter variable is used to record the number of packets that have been sent out since the most recent reordered packet.

Figure 3:
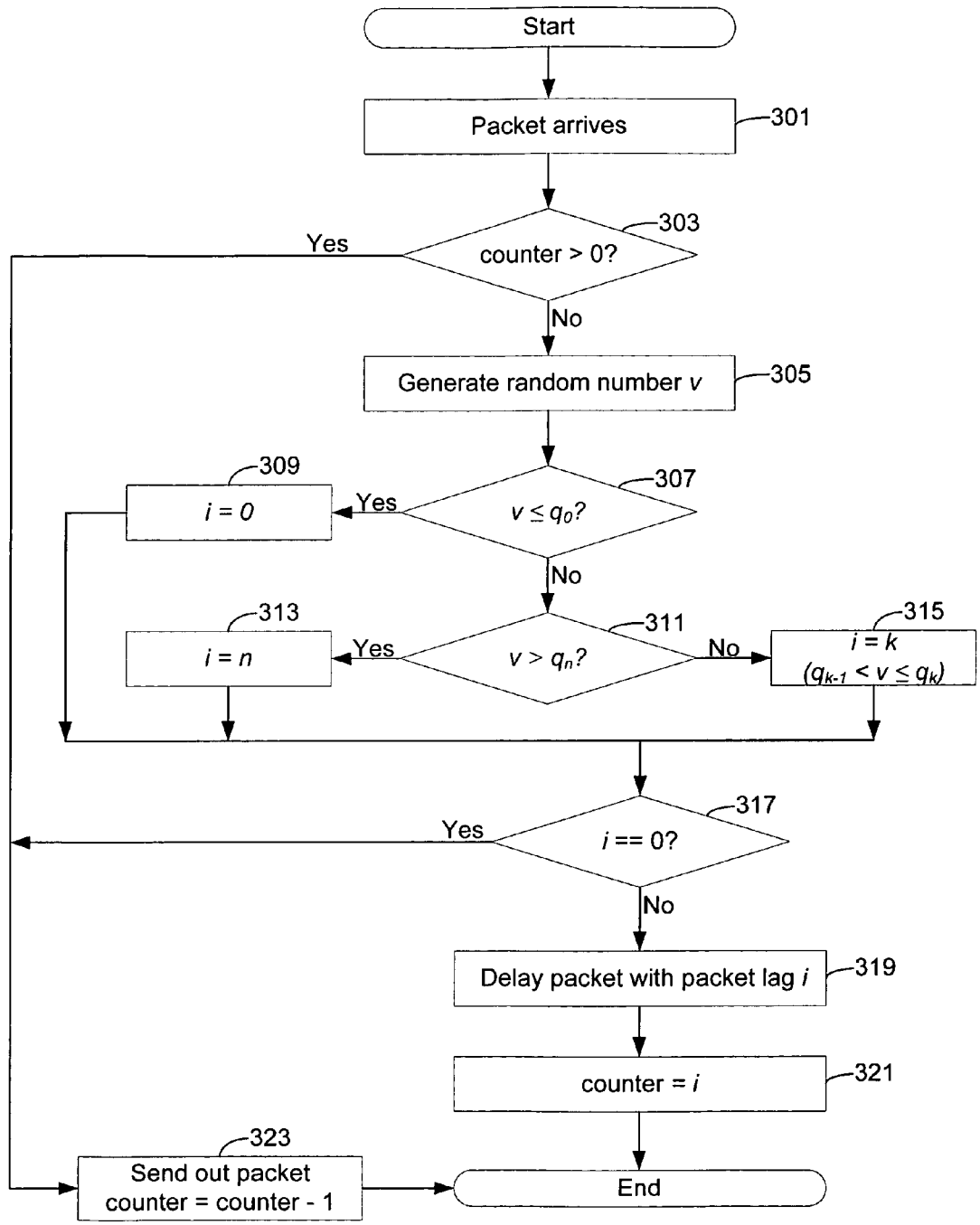
FIG. 3 is a flow diagram illustrating a packet reordering emulation process in accordance with the invention.

The flow diagram of FIG. 3 illustrates a procedure for packet out-of-order emulation in accordance with the invention. After a start block, the process flows to block 301, at which a packet arrives. If counter>0, determined at decision block 303, the process flows to block 323, at which the packet is sent out and the counter is decreased by one, after which the process flows to an end block. Otherwise, the process flows to block 305, at which a random number v is generated. At blocks 307-315 the current packet lag i is determined, in accordance with the following subprocedure:

if $v \leq q_0$ (decision block 307) then i=0 (block 309)

else if $v > q_n$ (decision block 311) then i=n (block 313)

else if $q_{k-1} < v \leq q_k$ then i=k (k>0) (block 315)

After the value of i is set, the process flows to decision block 317, which determines whether the value of i is 0. If so, the process flows to block 323, at which the packet is sent out and the counter is decreased by one, after which the process flows to an end block. Otherwise, at block 319, the packet is delayed with packet lag i, as explained further below. At block 321 the current packet lag i is recorded in the counter variable, after which the process flows to an end block.

To delay a packet with packet lag i, an additional latency is applied to the packet. The value of the latency is the result of the time cost to transmit the packet multiplied by i. The packet is actually reordered only if there are other packets that arrive during the period of the latency. If the interval among packets is large enough (i.e., the sending traffic is sufficiently low), no packet is reordered. This is realistic because in a real network, if the sending rate is very low, there are no out-of-order packets.

If packets arrive at a rate that is constant with respect to the underlying bandwidth, the result of the emulation procedure follows exactly the packet out-of-order behavior specified by the input parameters $(r, p_1, \ldots, p_n)$. This is verified by the following when $$\sum_{k=1}^{n}(k+1)p_k \leq 1:$$

Assume that, within a given time period, N packets were reordered by the algorithm. Then, in total, $$\sum_{k=0}^{n}(k+1)q_k \cdot N$$

packets arrive during the period. Among these N reordered packets, the number of packets having lag i is $q_i \cdot N$ ($i \geq 1$). We know that $$q_0 = 1 - \sum_{i=1}^{n} q_i$$

$$q_i = \frac{p_i}{1 - \sum_{k=1}^{n} k \cdot p_k}\left(i \geq 1, \sum_{k=1}^{n}(k+1)p_k \leq 1\right)$$

Therefore, the probability of reordered packets having lag i ($i \geq 1$) is:

$$p_i = \frac{q_i \cdot N}{\sum_{k=0}^{n}(k+1) \cdot q_k \cdot N} = \frac{q_i}{\sum_{k=0}^{n}(k+1) \cdot q_k}$$

$$= \frac{q_i}{q_0 + \sum_{k=1}^{n} q_k + \sum_{k=1}^{n} k \cdot q_k} = \frac{q_i}{1 + \sum_{k=1}^{n} k \cdot q_k}$$

$$= \frac{\frac{p_i}{1 - \sum_{k=1}^{n} k \cdot p_k}}{1 + \sum_{k=1}^{n} k \cdot \frac{p_k}{1 - \sum_{j=1}^{n} j \cdot p_j}} = \frac{p_i}{1 - \sum_{j=1}^{n} j \cdot p_j + \sum_{k=1}^{n} k \cdot p_k}$$

$$= p_i$$

Additionally, $$p_0 = 1 - \sum_{k=1}^{n} p_i = 1 - r$$

If $$\sum_{k=1}^{n}(k+1)p_k > 1,$$

the resulting packet out-of-order rate is lower than r. However, it has been proved that the emulation algorithm can achieve r=42.3% for any given n, and in real networks the packet out-of-order rate is much lower than 42.3%.

In an embodiment of the invention, two techniques are used to avoid the need to set each $p_i$ in $(p_1, \ldots, p_n)$ individually. Turning again to FIG. 2, three packet out-of-order pattern types for the packet reorder module 255 are provided: a normal reorder 259 and two empirically-derived reorder patterns 261, 263. In accordance with one technique, if the user selects the normal type 259, it is assumed that $(p_1, \ldots, p_n)$ and thus the packet lag distribution of reordered packets follow the right half of the normal distribution with average value 0. The user specifies the standard deviation of the normal distribution, the rate of reordered packets, and the maximum possible packet lag of reordering. $(p_1, \ldots, p_n)$ are then calculated automatically. In accordance with a second technique, the user selects one of the empirical patterns 261, 263, which are based on observations of real networks. Selection of an empirical type frees the user from the need to set $(p_1, \ldots, p_n)$; the user need specify only the rate of reordered packets.

In a first empirical reorder pattern 261, packet out-of-order behavior of a network link is emulated by using the following packet lag distribution data collected from the Sprint commercial IP backbone.

| Packet Lag | Probability |
|---|---|
| 1 | 0.425 |
| 2 | 0.185 |
| 3 | 0.115 |
| 4 | 0.070 |
| 5 | 0.055 |
| 6 | 0.025 |
| 7 | 0.015 |
| 8 | 0.012 |
| 9 | 0.011 |
| 10 | 0.010 |
| 11 | 0.009 |
| 12 | 0.009 |
| 13 | 0.008 |
| 14 | 0.008 |
| 15 | 0.007 |
| 16 | 0.007 |
| 17 | 0.006 |
| 18 | 0.006 |
| 19 | 0.005 |
| 20 | 0.005 |
| 21 | 0.004 |
| 22 | 0.003 |
| 23 | 0.002 |
| 24 | 0.002 |
| 25 | 0.001 |

In a second empirical reorder pattern 263, packet out-of-order behavior of a network link is emulated by using the following packet lag distribution data collected from the China Education and Research Network (CERNET).

| Packet Lag | Probability |
|---|---|
| 1 | 0.865 |
| 2 | 0.088 |
| 3 | 0.029 |
| 4 | 0.012 |
| 5 | 0.005 |
| 6 | 0.001 |

Preferred embodiments of the present invention are described herein, including the best mode known to the inventors for carrying out the invention. In view of the many possible embodiments to which the principles of this invention may be applied, it should be recognized that the embodiments described herein are meant to be illustrative only and should not be understood to limit the scope of the invention. Those having skill in the art will recognize that the described embodiments can be modified in arrangement and detail without departing from the spirit of the invention. Therefore, the invention as described herein contemplates all such embodiments as may come within the scope of the following claims and equivalents thereof.

What is claimed is:

1. A method for emulating a packet reorder condition, the method comprising:
   maintaining a counter variable to count packets sent out since a most recent reordered packet; and
   when a new packet arrives, if the counter variable is not greater than zero,
      determining the current packet lag value;
      if the current packet lag value is not equal to zero,
         delaying the new packet in accordance with the current packet lag value, and
         recording the current packet lag value in the counter variable.

2. The method of claim 1, wherein determining the current packet lag value further comprises computing a set of parameters $(q_0, q_1, \ldots, q_n)$, based on n, a configuration parameter representing a maximum packet lag; r, a configuration parameter representing a rate of reordered packets; and $(p_1, p_2, \ldots, p_n)$, a given probability distribution of reordered packets, such that $$\sum_{i=1}^{n} p_i = r,$$

wherein $p_i$ represents a probability of a packet having a packet lag i.

3. The method of claim 2, wherein computing the set of parameters $(q_0, q_1, \ldots, q_n)$ further comprises:
   if $$\sum_{k=1}^{n} (k+1)p_k \leq 1,$$

setting $q_0$ to $$1 - \sum_{i=1}^{n} q_i,$$

and, for values of i greater than zero, setting $q_i$ to $$\frac{p_i}{1 - \sum_{k=1}^{n} k \cdot p_k};$$

and otherwise,
   setting $q_0$ to 0, and, for values of i greater than zero, setting $q_i$ to $$\frac{p_i}{\sum_{i=1}^{n} p_i}.$$

4. The method of claim 3, wherein determining the current packet lag value further comprises:
   generating a random number;
   if $q_0$ is not less than the random number, setting the current packet lag value to zero;
   if the random number is greater than $q_n$, setting the current packet lag value to n; and otherwise,
   if the random number is greater than $q_{k-1}$ and is at most $q_k$, for a value of k greater than zero, setting the current packet lag value to k.

5. The method of claim 2, wherein the probability distribution of reordered packets $(p_1, p_2, \ldots, p_n)$ follows a normal distribution with a given standard deviation.

6. The method of claim 2, wherein empirical data is substituted for the distribution $(p_1, p_2, \ldots, p_n)$.

7. The method of claim 1, wherein delaying the new packet further comprises applying a latency to the packet, the latency comprising a time cost to transmit the packet multiplied by the current packet lag value.

8. A system for emulating a packet reorder condition, the system comprising:
   a first computer having a network interface;
   an emulator link for receiving and sending packets, the emulator link comprising a virtual network link to which the first computer is connected; and
   a packet reorder emulation module controlled by the emulator link, wherein the packet reorder emulation module performs actions comprising:
   maintaining a counter variable to count packets sent out since a most recent reordered packet; and
   when a new packet arrives, if the counter variable is not greater than zero,
      determining the current packet lag value;
      if the current packet lag value is not equal to zero,
         delaying the new packet in accordance with the current packet lag value, and
         recording the current packet lag value in the counter variable.

9. The system of claim 8, wherein the packet reorder emulation module performs actions further comprising:
   computing a set of parameters $(q_0, q_1, \ldots, q_n)$, based on n, a configuration parameter representing a maximum packet lag; r, a configuration parameter representing a rate of reordered packets; and $(p_1, p_2, \ldots p_n)$, a given probability distribution of reordered packets, such that $$\sum_{i=1}^{n} p_i = r,$$

wherein $p_i$ represents a probability of a packet having a packet lag i.

10. The system of claim 9, wherein at least one of n, r, and $(p_1, p_2, \ldots, p_n)$ are supplied by a user of the emulator link.

11. The system of claim 9, wherein computing the set of parameters $(q_0, q_1, \ldots, q_n)$ further comprises:
   if $$\sum_{k=1}^{n} (k+1)p_k \leq 1,$$

setting $q_0$ to $$1 - \sum_{i=1}^{n} q_i,$$

and, for values of i greater than zero, setting $q_i$ to $$\frac{p_i}{1 - \sum_{k=1}^{n} k \cdot p_k};$$

and otherwise,
 setting $q_0$ to 0, and, for values of i greater than zero, setting $q_i$ to $$\frac{p_i}{\sum_{i=1}^{n} p_i}.$$

12. The system of claim 11, wherein determining the current packet lag value further comprises:
 generating a random number;
 if $q_0$ is not less than the random number, setting the current packet lag value to zero;
 if the random number is greater than $q_n$, setting the current packet lag value to n; and otherwise,
 if the random number is greater than $q_{k-1}$ and is at most $q_k$, for a value of k greater than zero, setting the current packet lag value to k.

13. The system of claim 9, wherein delaying the new packet further comprises applying a latency to the packet, the latency comprising a time cost to transmit the packet multiplied by the current packet lag value.

14. The system of claim 9, wherein the probability distribution of reordered packets $(p_1, p_2, \ldots, p_n)$ follows a normal distribution with a given standard deviation.

15. The system of claim 9, wherein empirical data is substituted for the distribution $(p_1, p_2, \ldots, p_n)$.

16. The system of claim 8, further comprising a second computer linked to the first computer by way of a local area network.

17. A computer-readable medium having computer-executable instructions for emulating a packet reorder condition, the instructions comprising:
 maintaining a counter variable to count packets sent out since a most recent reordered packet; and
 when a new packet arrives, if the counter variable is not greater than zero,
  determining the current packet lag value;
  if the current packet lag value is not equal to zero,
   delaying the new packet in accordance with the current packet lag value, and
   recording the current packet lag value in the counter variable.

18. The computer-readable medium of claim 17, wherein determining the current packet lag value further comprises computing a set of parameters $(q_0, q_1, \ldots, q_n)$, based on n, a configuration parameter representing a maximum packet lag; r, a configuration parameter representing a rate of reordered packets; and $(p_1, p_2, \ldots p_n)$, a given probability distribution of reordered packets, such that $$\sum_{i=1}^{n} p_i = r,$$

wherein $p_i$ represents a probability of a packet having a packet lag i.

19. The computer-readable medium of claim 18, wherein computing the set of parameters $(q_0, q_1, \ldots, q_n)$ further comprises:
 if $$\sum_{k=1}^{n} (k+1)p_k \le 1,$$

setting $q_0$ to $$1 - \sum_{i=1}^{n} q_i,$$

and, for values of i greater than zero, setting $q_i$ to $$\frac{p_i}{1 - \sum_{k=1}^{n} k \cdot p_k};$$

and otherwise,
 setting $q_0$ to 0, and, for values of i greater than zero, setting $q_i$ to $$\frac{p_i}{\sum_{i=1}^{n} p_i}.$$

20. The computer-readable medium of claim 19, wherein determining the current packet lag value further comprises:
 generating a random number;
 if $q_0$ is not less than the random number, setting the current packet lag value to zero;
 if the random number is greater than $q_n$, setting the current packet lag value to n; and otherwise,
 if the random number is greater than $q_{k-1}$ and is at most $q_k$, for a value of k greater than zero, setting the current packet lag value to k.

21. The computer-readable medium of claim 18, wherein the probability distribution of reordered packets $(p_1, p_2, \ldots, p_n)$ follows a normal distribution with a given standard deviation.

22. The computer-readable medium of claim 18, wherein empirical data is substituted for the distribution $(p_1, p_2, \ldots, p_n)$.

23. The computer-readable medium of claim 17, wherein delaying the new packet further comprises applying a latency to the packet, the latency comprising a time cost to transmit the packet multiplied by the current packet lag value.

* * * * *